US008497876B2

(12) United States Patent
Yuen et al.

(10) Patent No.: US 8,497,876 B2
(45) Date of Patent: Jul. 30, 2013

(54) INFINITE COMPLEXITY DEEP-FRAMEBUFFER RENDERING

(75) Inventors: Stephen Yuen, San Francisco, CA (US); Eric Tabellion, Belmont, CA (US)

(73) Assignee: Pacific Data Images LLC, Redwood City, CA (US)

( * ) Notice: Subject to any disclaimer, the term of this patent is extended or adjusted under 35 U.S.C. 154(b) by 940 days.

(21) Appl. No.: 12/611,034

(22) Filed: Nov. 2, 2009

(65) Prior Publication Data
US 2011/0102440 A1    May 5, 2011

(51) Int. Cl.
*G09G 5/00*      (2006.01)
(52) U.S. Cl.
USPC ............................................. 345/635; 345/545
(58) Field of Classification Search
USPC .................................................. 345/545, 635
See application file for complete search history.

(56) References Cited

PUBLICATIONS

Extended European Search Report received for European Patent Application No. 10251837.0, mailed on Feb. 1, 2011, 5 pages.
Kapasi et al., "A Hardware Accelerated Relighting Engine for RenderMan", 2001, 10 pages.
Adamsen, Mikkel, "ReRendering", Sep. 24, 2007, pp. 1-18.
Apodaca, A.A. et al. (2000). "How PhotoRealistic RenderMan Works . . . and What You Can Do About It," Chapter 6 in *Advanced RenderMan™: Creating CGI for Motion Pictures*, Morgan-Kaufmann Publishers: San Francisco, CA, pp. 135-156.
Chen, M. et al. (1998). "Models of the Impact of Overlap in Bucket Rendering," *1998 SIGGRAPH*, 8 pages.
Cook, R.L. et al. (Jul. 1987). "The Reyes Image Rendering Architecture," *Computer Graphics* 21(4):95-102.
Everitt, C. (2001). "Interactive Order-Independent Transparency," *NVIDIA Proprietary*, located at < http://developer.nvidia.com/object/Interactive_Order_Transparency.html>, last visited on Feb. 9, 2010, 11 pages.
Gershbein, R. et al. (2000). "A Fast Relighting Engine for Interactive Cinematic Lighting Design," *Computer Graphics Proceedings, Annual Conference Series*, SIGGRAPH 2000, New Orleans, LA, Jul. 23-28, 2000, pp. 353-358.
Greene, N. et al. (1993). "Hierarchical Z-Buffer Visibility," *Computer Graphics Proceedings, Annual Conference Series*, SIGGRAPH 93, Anaheim, CA, Aug. 1-6, 1993, pp. 231-240.
Hasan, M. et al. (2006). "Direct-to-Indirect Transfer for Cinematic Relighting," *ACM Transactions on Graphics* 25 pp. 1089-1097.
*n*VIDIA. (Aug. 8, 2005). "Sorbetto Relighting Technology," located at <film.nvidia.com/docs/CP/4825/gelato_2.0_wp.pdf>, last visited on Jan. 25, 2010, 7 pages.
Pellacini, F. et al. (2005). "Lpics: A Hybrid Hardware-Accelerated Relighting Engine for Computer Cinematography," *ACM Transactions on Graphics* 24 pp. 464-470.
Ragan-Kelley, J. et al. (Jul. 2007). "The Lightspeed Automatic Interactive Lighting Preview System," *ACM Transactions on Graphics* 26(3): Article 25, 25.1-25.11.

(Continued)

*Primary Examiner* — Maurice L McDowell, Jr.
(74) *Attorney, Agent, or Firm* — Morrison & Foerster LLP (57) ABSTRACT

A method of rendering a scene with a plurality of objects includes rendering an object in a scene, wherein a portion of the object spans at least two of a plurality of non-overlapping tiles that subdivide the scene, and wherein the portion of the object is rendered only once in rendering the scene. The process further includes storing the rendered output of the object into a deep-framebuffer. While rendering the object and storing the rendered output of the object, in response to the size of the deep-framebuffer reaching a predetermined threshold, the steps that are performed include dividing the deep-framebuffer's contents based on the plurality of non-overlapping tiles, storing the divided contents of the deep-framebuffer in a plurality of tile files, and clearing the contents of the deep-framebuffer.

33 Claims, 9 Drawing Sheets

PUBLICATIONS

Saito T. et al. (Aug. 1990). "Comprehensible Rendering of 3-D Shapes," *Computer Graphics*, SIGGRAPH '90 Conference Proceedings, Dallas, TX, Aug. 6-10, 1990, 24(4):197-206.

Séquin, C.H. et al. (Jul. 1989). "Parameterized Ray Tracing," *Computer Graphics*, SIGGRAPH '89, Boston, MA, Jul. 31-Aug. 4, 1989, 23(3)307-314.

Tabellion, E. et al. (2004). "An Approximate Global Iillumination System for Computer Generated Films," *ACM Transactions on Graphics* 23, pp. 469-476.

Wexler, D. et al. (2005). "High-Quality Antialiased Rasterization," Chapter 21 in *GPU Gems 2*, Pharr, M. ed., Addison-Wesley, Upper Saddle River, NJ, pp. 331-344.

Wexler, D. et al. (Jul. 2005). "GPU-Accelerated High-Quality Hidden Surface Removal," *Graphics Hardware* pp. 7-14, 113.

INFINITE COMPLEXITY DEEP-FRAMEBUFFER RENDERING

BACKGROUND

1. Field

This application relates generally to computer graphics, and more specifically to computer systems and processes for rendering scenes using deep-framebuffer rendering techniques.

2. Related Art

Images used in high-quality motion pictures need to be photorealistic. Since the mid-1980s, algorithms utilizing the Reyes rendering architecture have been used for fast, high-quality rendering of complex scenes of motion pictures. The Reyes rendering architecture was developed in the mid-1980s with the specific goal of creating a rendering algorithm that would be applicable to creating special effects for motion pictures. The architecture efficiently achieves several important effects: smooth curved surfaces, surface texturing, motion blur, and depth of field.

However, the Reyes rendering architecture generally requires the entire framebuffer (a buffer that stores the contents of an image pixel by pixel) to be stored in memory since the final image cannot be outputted until all geometric primitives have been processed. Bucket rendering is a memory optimization technique in which the framebuffer is subdivided into buckets. Objects in a scene are placed into the buckets based on their location within the scene. Each bucket is rendered independently, and the data from a previously rendered bucket is discarded before the next bucket is processed. As a result, only the portion of the framebuffer corresponding to the current bucket and the high-level descriptions of all geometric primitives must be maintained in memory. The benefits of bucket rendering include a decrease in the size of the working set of framebuffer memory required during rendering and a reduction of the amount of Z-buffer memory (the buffer for storing the depth of each pixel) required to render high-resolution images with high-depth complexity, motion blur, and/or depth of field. With bucket rendering, the shading step may be deferred until visibility determination is completed within the bucket being rendered, and unnecessary shading of hidden surfaces may be eliminated.

However, using bucket rendering in a Reyes rendering architecture has a number of drawbacks. One drawback is the redundant computations required in processing geometric primitives when the full list of primitives does not fit entirely in memory and when primitives span multiple buckets, as is the case in most complex scenes. Bucket rendering requires careful memory management to handle such complex scenes. In some implementations, the primitive data from a previously rendered bucket is discarded before the next bucket is processed. As a result, re-processing/regeneration of the same geometric primitives that span subsequent buckets results in a significant amount of redundant computation. In some implementations, the geometric primitives spanning multiple buckets may be kept in memory until all the subsequent spanned buckets are rendered. However, when the list of accumulated geometric primitives has filled up the memory devoted to that purpose, some of these geometric primitives are discarded anyways and re-processing/regeneration of these geometric primitives still results in expensive redundant computations. The geometry shaders responsible for generating geometry may be coded to only focus on primitives that span the bucket(s) being rendered so as to reduce the amount of redundant computation associated with bucket rendering. However, the geometry shaders become much more difficult to write.

As an alternative to Reyes rendering, deep-framebuffer rendering algorithms may be employed for fast, high-quality rendering of complex scenes of motion pictures. Unlike a traditional framebuffer, which only stores color, opacity, and depth information per pixel, a deep-framebuffer caches the information of pieces of geometry visible on each pixel of an image from the point of view of a virtual camera. During the rasterization process, pieces of geometry that are fully occluded by other opaque pieces of geometry are removed from the deep frame-buffer. Therefore, the deep-framebuffer only stores pieces of geometry that are visible directly from the camera or visible through other semi-transparent and non-refractive pieces of geometry. Besides defining which pieces of geometry are visible on each pixel of an image, the deep-framebuffer also defines how much the pieces of geometry overlap when viewed from the virtual camera. This extra information stored in the deep-framebuffer, but not in a traditional framebuffer, is useful for evaluating shading later down the rendering pipeline. A scene may be shaded multiple times after adjusting shading parameters without repeating any geometry generation, tessellation, or rasterization steps because the result of these steps is already stored in the deep-framebuffer.

Typically, the information stored in the deep-framebuffer includes a z-sorted list (i.e., sorted by depth from the camera) of visibility masks for each pixel. For example, the visibility mask may be an A-buffer coverage mask. Each visibility mask is a bit mask with each bit representing a particular sub-pixel. Each visibility mask defines which portion of that pixel is covered by a specific piece of geometry; the visibility mask may reference the corresponding geometry data structure, which stores per primitive data and/or per vertex information of the geometry, including the vertices' position, (u, v) texture coordinates, and position derivative vectors with respect to each of the (u, v) texture coordinates. This set of information is sufficient to evaluate shading further down the rendering pipeline.

In some examples, the pieces of geometry as described above are micropolygons. A micropolygon is a quadrilateral or a triangle that is about the size of a pixel when projected onto a screen. At rendering time, a geometric primitive—e.g., parametric surfaces (such as non-uniform rational B-spline, or NURBS, surfaces), subdivision surfaces, parametric curves, or polygons (large triangles or quads)—may be tessellated into micropolygons. Using micropolygons, a highly detailed image may be obtained. Displacement mapping may be applied to micropolygons before they are rasterized. Displacement mapping is a technique where an image texture or a procedural texture or a height map is used to cause an effect where the micropolygon vertices of the textured surface are displaced, often along the local surface normal, according to the value the texture function evaluates to at each point on the surface. It gives surfaces a great sense of depth and detail, permitting in particular self-occlusion, self-shadowing, and complex silhouettes.

It should be recognized that a micropolygon may span multiple pixels, because micropolygons may not be perfectly aligned with pixels. Motion blur and depth of field are other factors that may result in the micropolygon-to-pixel relationship being one-to-many. Therefore, a geometry data structure corresponding to a micropolygon may be referenced by several visibility masks, one for each spanned pixel.

The deep-framebuffer may be saved into a single file (a deep file) and it may be read back from the deep file into memory for further processing. However, saving the deep-framebuffer into a single file at the end of a rendering process may limit the complexity or the richness of the scenes and the productivity of the artists who are generating the scenes. As scenes become more complex, the deep-framebuffer may grow well beyond the amount of memory available on the processing machine. A rendering process that has been running for hours or days may be terminated by the system because the size of the deep-framebuffer exceeds the memory available, and the whole rendering process must be restarted again after manual adjustments are made by human artists. An artist may be forced to choose between limiting the complexity or richness of the scenes, or implementing tedious workarounds, such as manual level-of-detail (LOD) techniques (i.e., techniques that decrease the complexity of 3D object representation based on object importance, eye-space speed, or position) when overly complex or large scenes must be generated by the rendering tools.

As an alternative to saving the deep-framebuffer into a single file at the end of a rendering process, memory optimization techniques may be used to subdivide a deep-framebuffer into tiles. Similar to bucket rendering techniques used in the Reyes rendering architecture, tiling techniques subdivide a scene and the deep-framebuffer corresponding to different parts of the scene into non-overlapping tiles. An object in a scene may span multiple tiles and portions of the object may be placed into each of those tiles. Rasterization is performed one tile at a time. Each tile is rendered independently, and the data from a previously rendered tile is discarded before the next tile is processed. As a result, only the portion of the deep-framebuffer corresponding to the current tile is maintained in memory. Thus, the size of the working set of deep-framebuffer memory required during rendering may be reduced.

However, similar to bucket rendering, one significant drawback of tiling is the redundant computations required in processing geometric primitives when the primitives span multiple tiles. Because the data from a previously rendered tile is discarded before the next tile is processed, re-processing of the same geometric primitives for subsequent tiles results in redundant computations. These redundant computations may be substantial, especially for geometries with long geometry generation, tessellation, and rasterization times or geometries that appear extensively over a scene, such as fur, hair, grass, trees, foliage, and the like.

SUMMARY

In one exemplary embodiment, a process includes rendering an object in a scene, wherein a portion of the object spans at least two of a plurality of non-overlapping tiles that subdivide the scene, and wherein the portion of the object is rendered only once in rendering the scene. The process further includes storing the rendered output of the object into a deep-framebuffer. While rendering the object and storing the rendered output of the object, in response to the size of the deep-framebuffer reaching a predetermined threshold, the steps that are performed include dividing the deep-framebuffer's contents based on the plurality of non-overlapping tiles, storing the divided contents of the deep-framebuffer in a plurality of tile files, and clearing the contents of the deep-framebuffer.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

In the present application, improved deep-framebuffer rendering techniques are employed for fast, high-quality rendering of complex scenes of motion pictures when memory resources may be limited. Instead of saving the deep-framebuffer into a single deep file at the end of the rendering process, which may cause memory problems, the rendering process is temporarily paused whenever the size of the deep-framebuffer reaches a predetermined memory threshold. After the rendering process is paused, the contents of the deep-framebuffer are divided into non-overlapping tiles that subdivide a scene. The divided contents of the deep-framebuffer are then stored into a plurality of tile files as partial tile outputs. The contents of the deep-framebuffer in the memory are then cleared before the rendering process is resumed. Note that the combined steps of storing the divided contents of the deep-framebuffer as partial tile outputs, and clearing the contents of the deep-framebuffer in the memory, is hereinafter referred to as memory flushing. The above cycle is repeated until all the objects in the entire scene are processed. The final scene is then reconstructed efficiently and accurately by merging the tile files to form a single deep file, which may be passed to a shading and/or re-lighting module for further processing. It should be recognized that the tiles form a partition of the entire scene, and the information of each tile is self-contained and independent from the other tiles. Therefore, the merging of the tile files may be performed in any order. As described in greater detail below, rasterization is performed on the entire scene and not one tile at a time. As a result, unlike other typical tiling techniques, re-rendering of objects that span or straddle over multiple tiles and redundant computations may be avoided.

Figure 1:
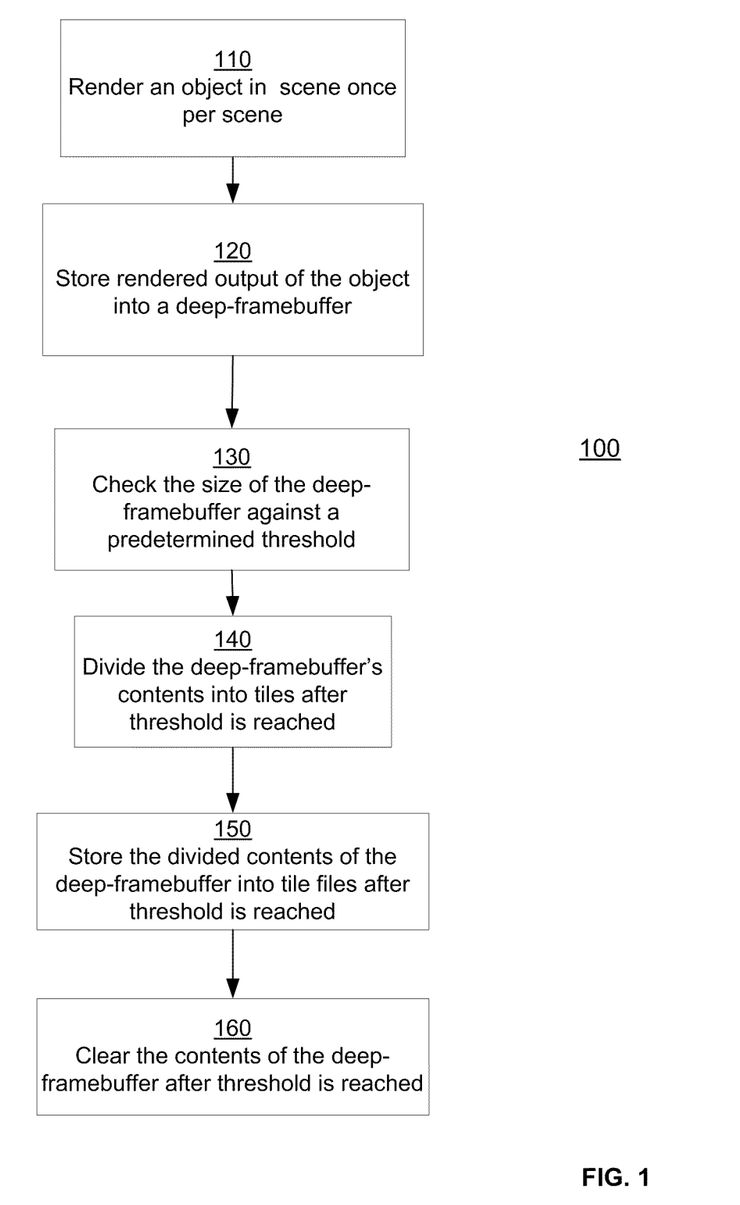
FIG. 1 illustrates an exemplary process for rendering scenes using deep-framebuffer rendering techniques and limited memory resources.

FIG. 1 illustrates an exemplary process 100 for efficiently rendering complex scenes with high image quality using improved deep-framebuffer rendering techniques and limited memory resources. At 110, an object in a scene is rendered. Portions of the object may span over more than one of the non-overlapping tiles that subdivide the scene. However, the rendering of each of these portions of the object is performed only once in the scene. At 120, the rendered output of the object is stored into a deep-framebuffer. At 130, the size of the deep-framebuffer is checked against a predetermined threshold. It should be recognized that the size of the deep-framebuffer may be checked against the predetermined threshold at any time while an object is being rendered. At 140, the deep-framebuffer's contents are divided into tiles. At 150, the divided contents of the deep-framebuffer are stored into a plurality of tile files. At 160, the contents of the deep-framebuffer in the memory are cleared.

It is contemplated that instead of clearing or zeroing the deep-framebuffer, the deep-framebuffer may be tagged or marked as storing stale information and thus its contents may be overwritten or discarded once the rendering process is resumed. Those of ordinary skill in the art will recognize that other similar implementations are possible. Accordingly, the term "clear" or "clearing" is intended to cover such implementations as well.

It should be recognized that some of the acts described in process 100 may be performed in slightly different orders or may be performed simultaneously. For example, 110 and 120 may be performed simultaneously. It should also be recognized that process 100 can be preceded by any number of processes performed as part of an animation process for a computer-generated animation sequence. For example, in one preceding process, the background and the basic shapes of the characters and objects within the scene may be created. It is also contemplated that process 100 may be repeated until all the objects in the scene are rendered. The rendered scene may then be reconstructed. Also, any number of processes may be performed subsequent to process 100 as part of the animation process for the computer generated animation sequence. For example, in one subsequent process, shading may be evaluated. In yet another subsequent process, additional special effects may be added to the computer-generated animation sequence.

Additionally, in one exemplary embodiment, during the rasterization process, an occlusion z-buffer in memory is used. The occlusion z-buffer stores a single depth value per pixel, which corresponds to the depth beyond which objects are occluded by other previously rendered objects, within this pixel. The occlusion z-buffer is updated as objects are rendered in a front-to-back order. The memory requirements of the occlusion z-buffer are relatively small compared to that of the deep-framebuffer and constant; therefore, the occlusion z-buffer can fit entirely in memory and is not cleared from memory as is the case with the deep-framebuffer.

When the occlusion z-buffer is used, before any given object is rendered, the occlusion z-buffer is used to test if the entire object, entire primitives, portions of primitives or individual micropolygons that form the given object, are occluded within a pixel or a group of pixels. When an object or a portion of an object is deemed occluded, its rendering can be skipped partially or entirely, which amounts to significant savings in rendering time. Z-buffer occlusion culling is also helpful in the context of infinite complexity deep-framebuffer rendering. In this context it avoids rendering objects that are entirely or partially occluded by objects that were rendered prior to the last deep-framebuffer memory flush event.

Figure 2:
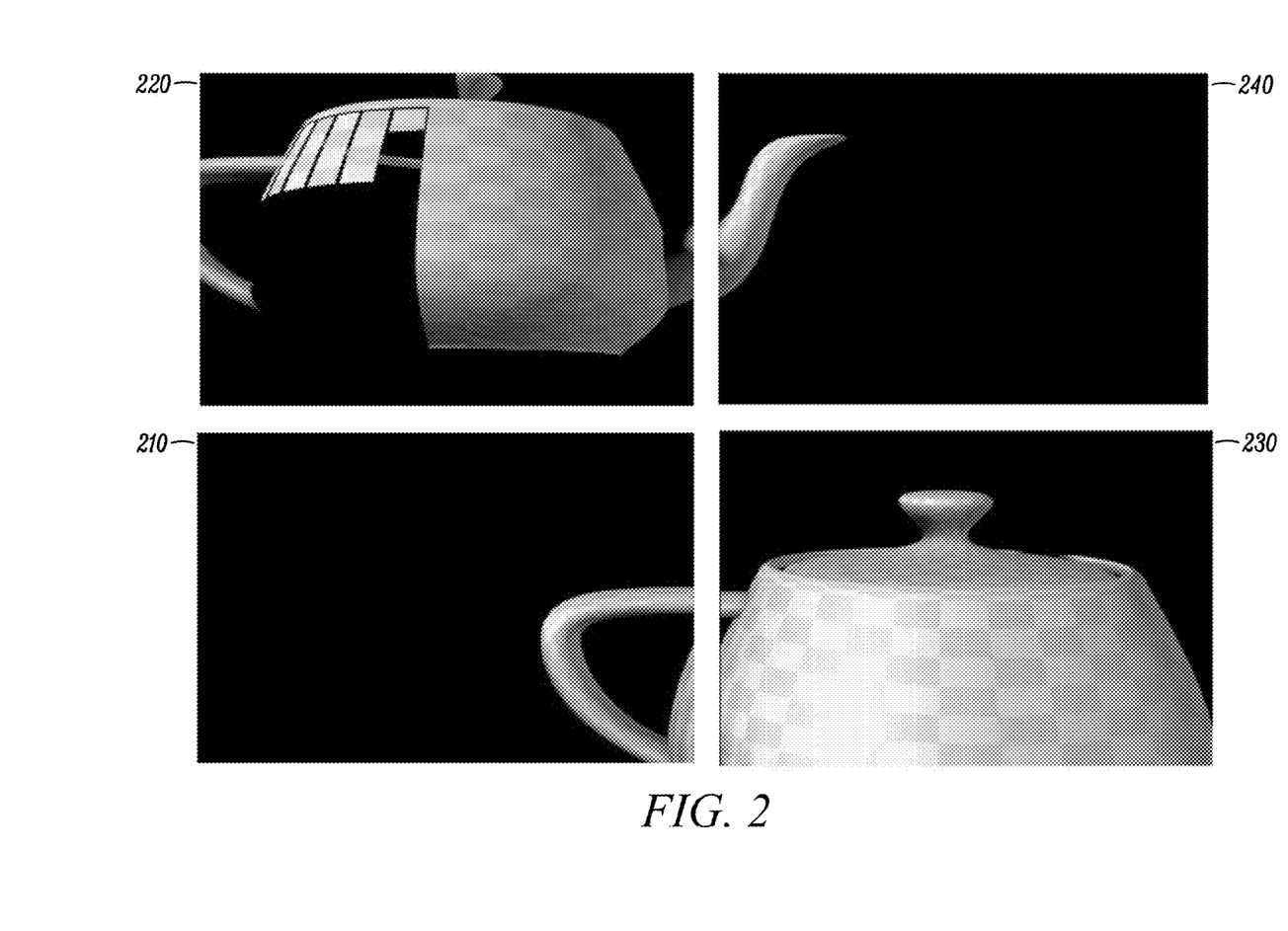
FIG. 2 shows rendered output obtained during a first stage of rendering an exemplary scene.
Figure 3:
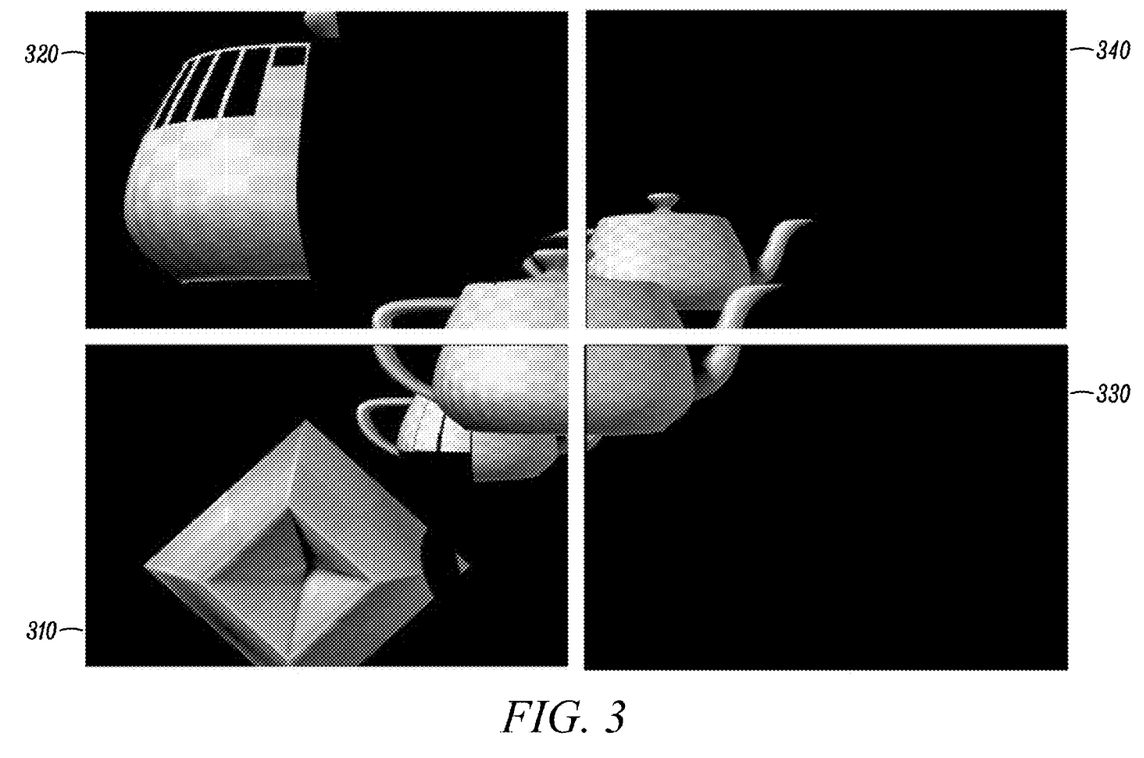
FIG. 3 shows rendered output obtained during a second stage of rendering an exemplary scene.
Figure 4:
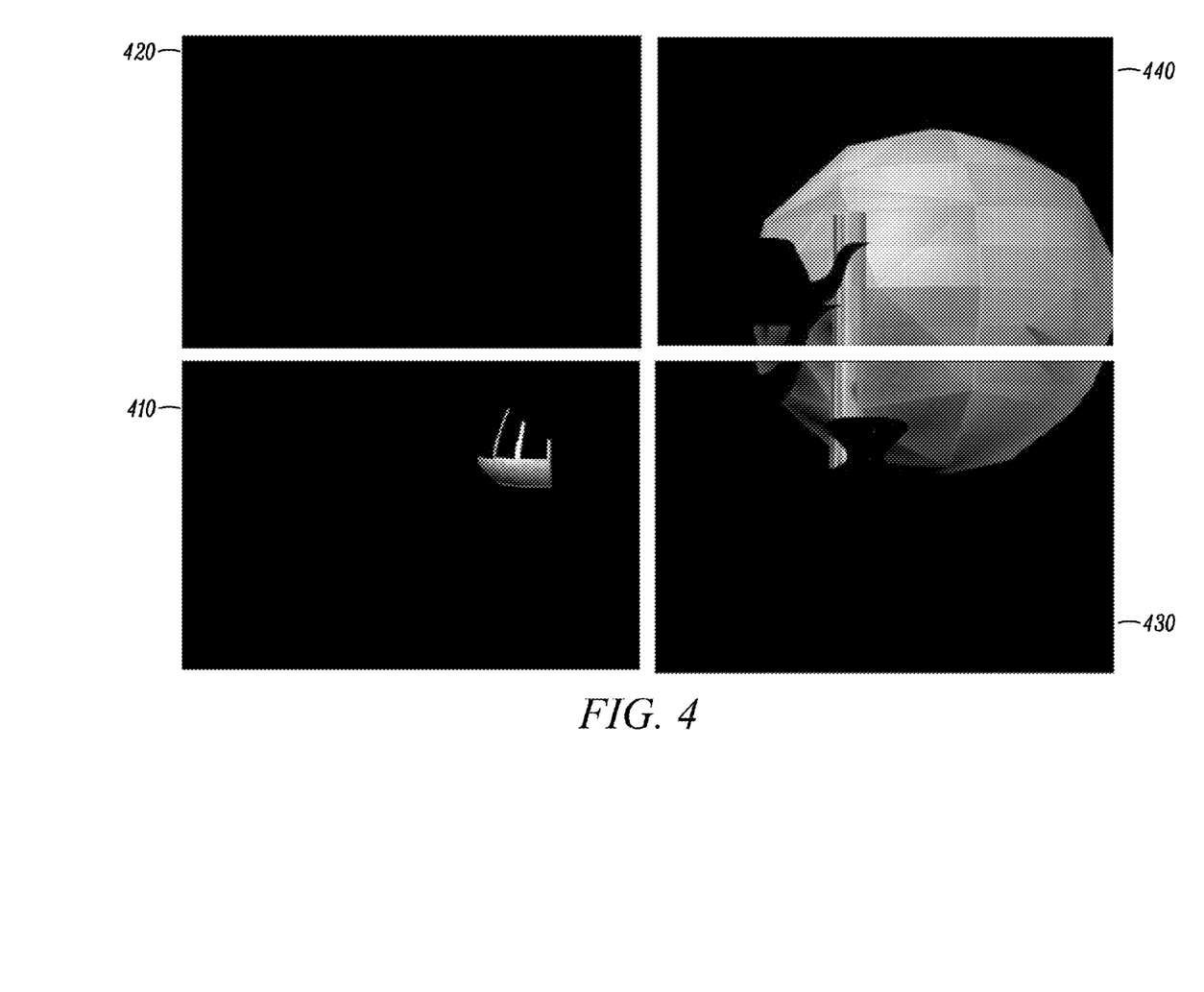
FIG. 4 shows rendered output obtained during a third stage of rendering an exemplary scene.
Figure 5:
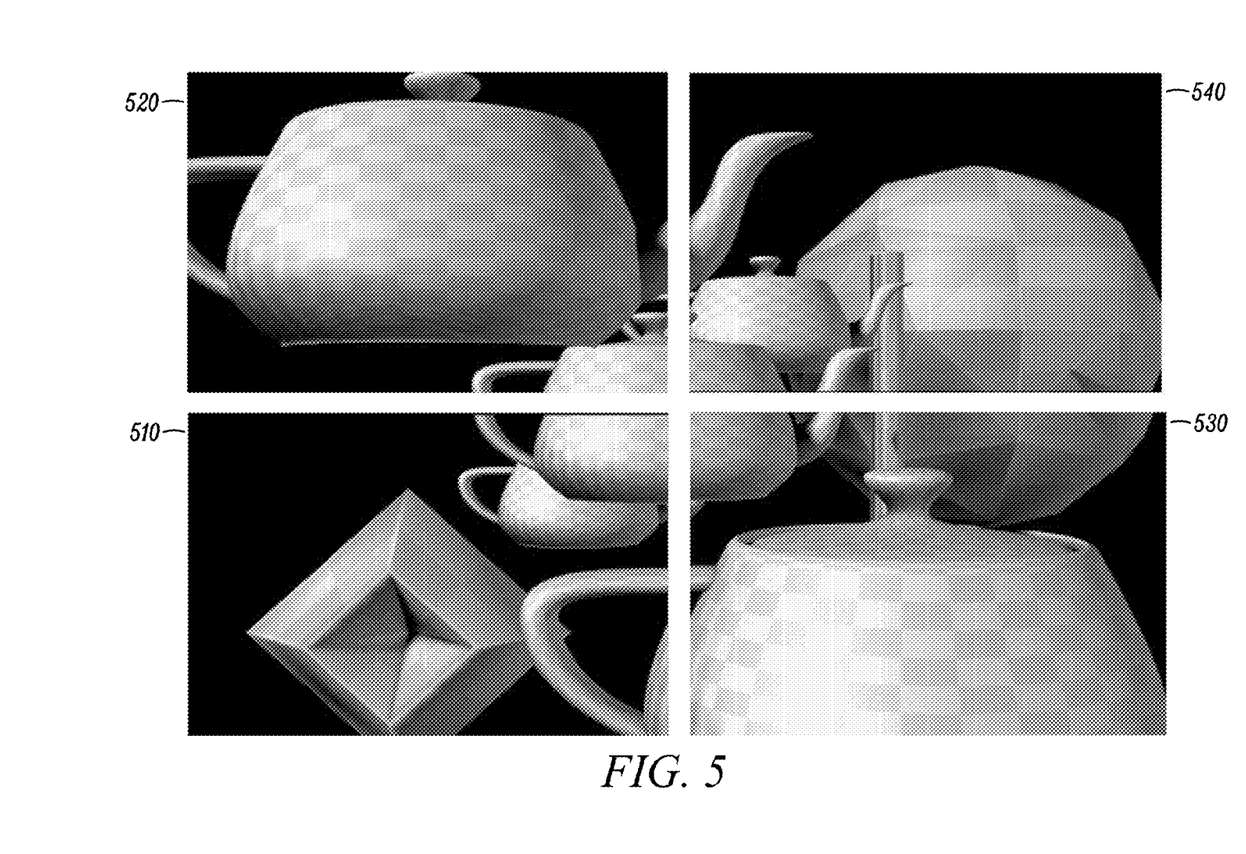
FIG. 5 illustrates exemplary complete tile files after all of the rendered output has been merged together for each of the tiles in an exemplary scene.
Figure 6:
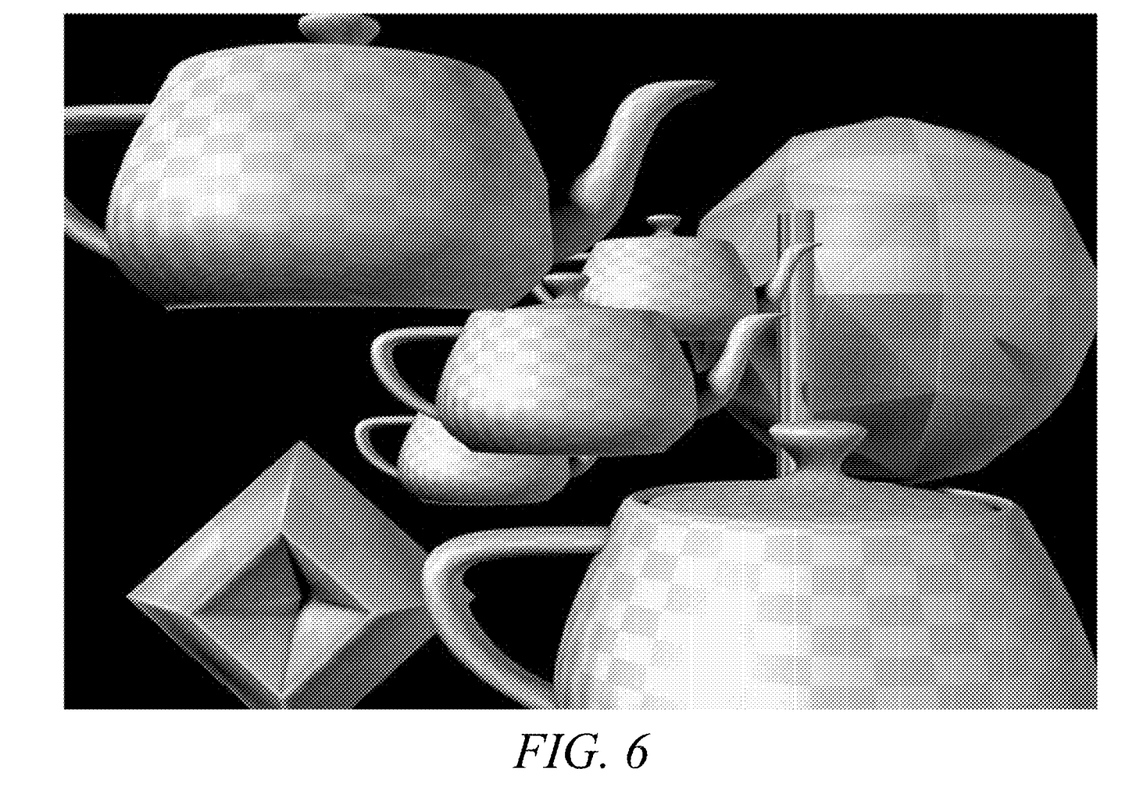
FIG. 6 illustrates an exemplary reconstructed scene after the complete tile files are merged together to form a single deep file representing the scene.

FIGS. 2-4 each illustrates an actual exemplary rendered output obtained during different stages of rendering an exemplary scene. FIG. 5 illustrates the complete tile files after all of the rendered output has been merged together for each of the tiles. FIG. 6 illustrates the reconstructed scene after the complete tile files are merged together to form a single deep file.

FIGS. 2-6 are referred to throughout the present application for illustration purposes and the exemplary scene will be referred hereinafter as the "teapots" scene.

As shown in FIGS. 2-6, the scene is subdivided into a set of two-by-two tiles. To be consistent, two-by-two tiles throughout the present application are labeled the same way as indicated in FIG. 7b. The bottom and upper left tiles are labeled as tile A 791 and tile B 792, respectively. The bottom and upper right tiles are labeled as tile C 793 and tile D 794.

FIG. 2 shows the rendered output between time 0 and time t0, the latter being the time when the deep-framebuffer first reaches a predetermined memory threshold. Note that most of the objects added to the scene before the first memory flush at time t0 are concentrated in tiles B (upper left tile) and C (bottom right tile). Note also that rasterization of the teapot in the bottom right tile has been completed before the memory flush at time t0, while rasterization of the teapot in the upper left tile has not. After time t0, the contents of the deep-framebuffer are saved to four tile files as partial tile outputs, as will be described in greater detail later in this application. The contents of the deep-framebuffer in the memory are also cleared before the rendering process is resumed.

FIG. 3 shows the rendered output between time t0 and time t1, the latter being the time when the deep-framebuffer reaches a predetermined memory threshold a second time. Note that rasterization of the teapot in the upper left tile is resumed after the first memory flush at time t0. Note also that additional objects are added to the scene after the first memory flush at time t0. After time t1, the contents of the deep-framebuffer are again saved to four tile files, and then the deep-framebuffer in the memory is cleared before the rendering process is resumed.

FIG. 4 shows the rendered output between time t1 and time t2, the latter being the time when all the objects in the scene are completely rendered and processed. This time the contents of the deep-framebuffer are saved and cleared even though the size of the deep-framebuffer has not reached a predetermined threshold yet.

FIG. 5 shows the complete tile files after all of the rendered output from time 0 to time t2 has been merged together for each of the tiles. FIG. 6 illustrates the reconstructed scene after the complete tile files are merged together to form a single deep file, which may be passed to a shading and/or re-lighting module for further processing.

Figure 7A:
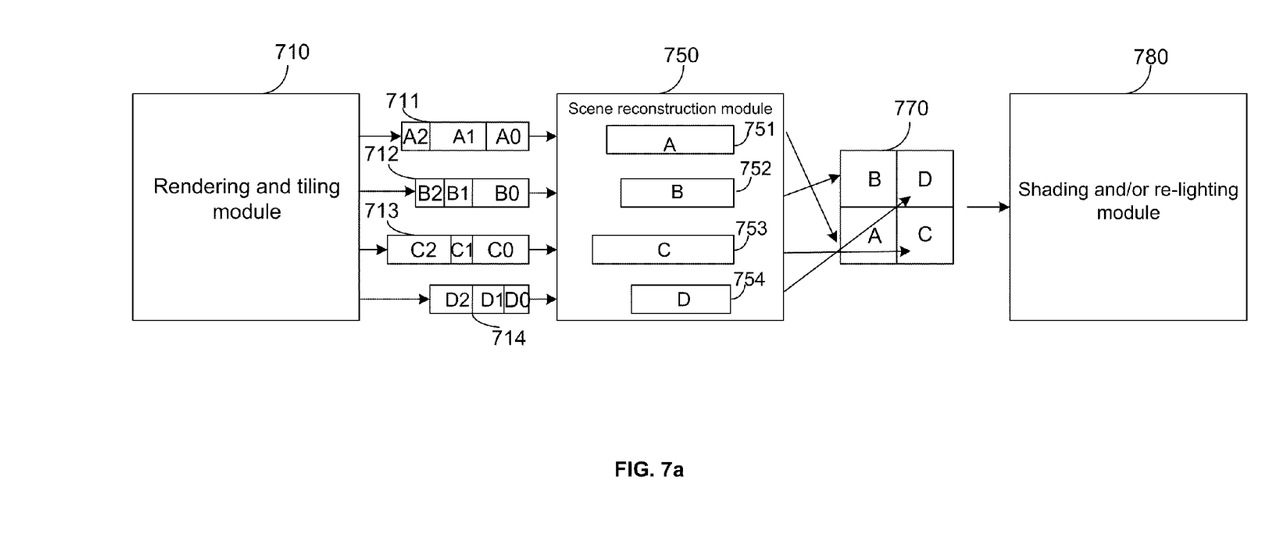
FIG. 7a illustrates an exemplary rendering system for rendering scenes using deep-framebuffer rendering techniques and limited memory resources.
Figure 7B:
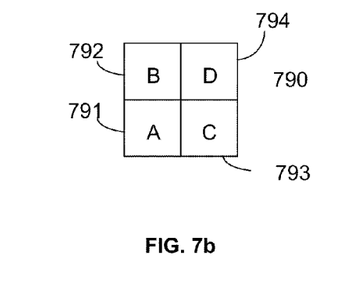
FIG. 7b illustrates an exemplary scene subdivided into a set of two-by-two tiles.

FIG. 7a illustrates an exemplary rendering system that may be used to generate the scene as shown in FIG. 6. A rendering and tiling module 710 generates a scene by adding objects to the scene and rendering them. These objects may include relatively simple objects, such as a ball, a box, a balloon, and the like, or highly complex objects, such as hair, fur, grass, trees, flowers, and the like. The "teapots" scene shown in FIG. 6 contains different objects, including teapots, a sphere, a rod, and an ashtray-like object. It should be recognized that these objects may be further divided into geometry primitives and then further tessellated into micropolygons as described above. Also, as described earlier, the rendered output is stored into the deep-framebuffer. In particular, information is collected into the deep-framebuffer during the rasterization process; the information includes which pieces of geometry are visible on each pixel of an image and how much the pieces of geometry overlap when viewed from the virtual camera.

It should be recognized that each object added to the scene is processed and rendered to completion and processed only once per scene. However, the processing of each object may be paused when the size of the deep-framebuffer reaches a predetermined memory threshold, at which time the contents of the deep-framebuffer are saved from memory to a plurality of tile files 711-714. After the memory save, the deep-framebuffer in the memory is then cleared and the scene generation and/or rasterization may be resumed. For example, if the memory threshold is reached before a particular object is completely processed by the rendering and tiling module 710, the processing of that object may be resumed after the memory flush. The rendering and tiling module 710 may continue to add new objects to the scene and process them until the memory threshold is reached and the deep-framebuffer is saved and cleared again. This process is repeated until all the objects on the scene are processed and rendered.

Figure 8:
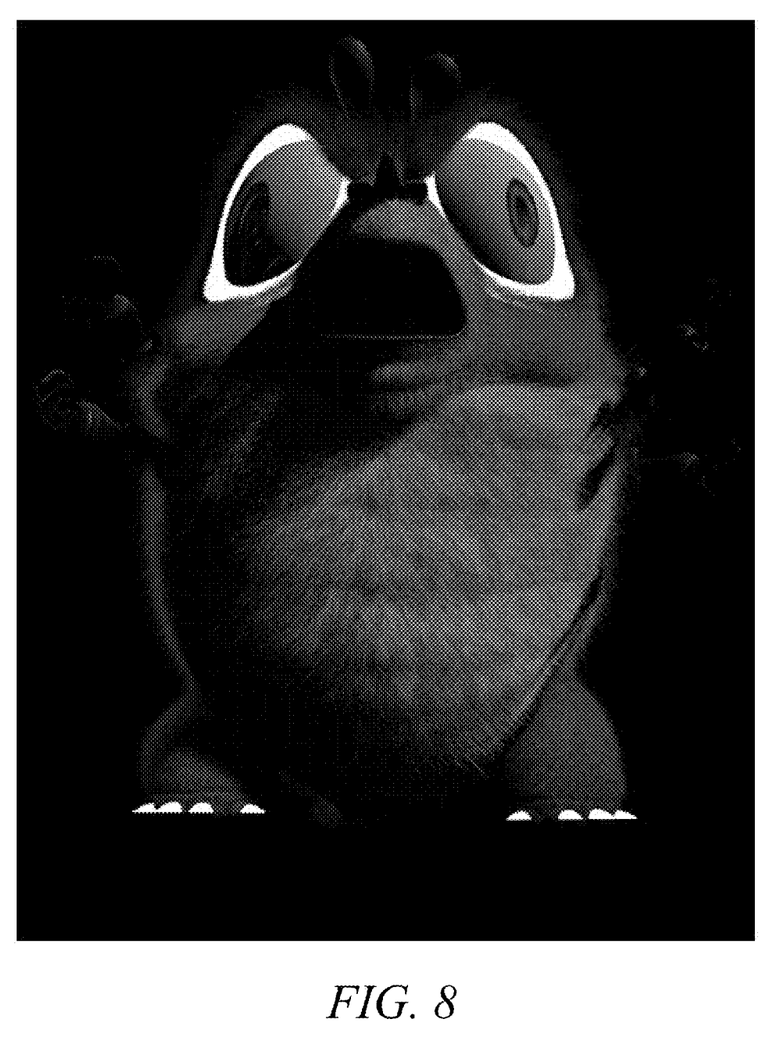
FIG. 8 illustrates an exemplary scene with a furry Insectosaurus subdivided into fifteen-by-fifteen tiles.

In one exemplary embodiment, a scene 790 (e.g., the "teapots" scene shown in FIG. 6) may be subdivided into a set of two-by-two tiles—tile A 791, tile B 792, tile C 293, and tile D 294, as shown in FIG. 7*b*. The tiles form a partition of the screen: a set of non-overlapping shapes that together cover the entire surface of the screen. It should be recognized that there are many ways to subdivide a scene into tiles. For example, tiles may have shapes other than squares, and they may have the same or different sizes. In addition, the scene may be subdivided into a fewer or greater number of tiles. In one exemplary embodiment, the scene is subdivided into ten-by-ten tiles. In another exemplary embodiment, a complex scene with a furry Insectosaurus, as shown in FIG. 8, is subdivided into fifteen-by-fifteen tiles. Generally, the scene may be divided into tiles based on the complexity of the objects in the screen, which sections of the scene contain the most or least complex objects, or other factors. Alternatively, the artist generating the scene may enter the sizes or shapes of the tiles into the system as user inputs.

With continued reference to FIGS. 7*a* and 7*b*, when the size of the deep-framebuffer first reaches a predetermined memory threshold at time t0, the contents of the deep-framebuffer that correspond to tile A 791 may be saved to a tile file 711 as a partial tile output A0. In the "teapots" scene example, partial tile output A0 is shown as image 210 in FIG. 2. Similarly, partial tile outputs B0, C0, and D0, corresponding to tiles B, C, and D, respectively, may be saved to tile files 712, 713, and 714, respectively. In the "teapots" scene example, partial tile outputs B0, C0, and D0 are shown as images 220, 230, and 240 in FIG. 2. Note that most of the objects added to the scene before the first memory flush at time t0 are concentrated in tiles B and C (see images 220 and 230 of FIG. 2). Therefore, the sizes of partial tile outputs B0 and C0 appear to be larger than partial tile outputs A0 and D0 in FIG. 7*a*.

After the deep-framebuffer in the memory is cleared, the rendering and tiling module 710 may continue to generate the scene, and when the size of the deep-framebuffer reaches the predetermined memory threshold again at time t1, partial tile outputs A1, B1, C1, and D1 may be saved in tile files 111-114, respectively. In the "teapots" scene example, partial tile outputs A1, B1, C1, and D1 are shown as images 310, 320, 330, and 340 in FIG. 3.

After the deep-framebuffer in the memory is cleared, the cycle is repeated again. At time t2, the entire scene is generated and the contents remaining in the deep-framebuffer may again be saved as partial tile outputs A2, B2, C2, and D2 into tile files 711-714, respectively. In the "teapots" scene example, partial tile outputs A2, B2, C2, and D2 are shown as images 410, 420, 430, and 440 in FIG. 4.

It should be recognized that the number of memory flushes for each scene may be different. The number may depend on the complexity of the scene generated. In the "teapots" scene example, the number of memory flushes is only three. In another example, as shown in FIG. 8, the number of memory flushes for a complex scene with a furry Insectosaurus is eleven. In general, the more complex the scene, the bigger the size of the deep-framebuffer is and the higher the number of memory flushes required. The number of memory flushes may also depend on the predetermined memory threshold. In general, the smaller the predetermined memory threshold, the higher the number of memory flushes required. The predetermined memory threshold may be selected based on different factors. In one example, it may be selected based on the memory available on a single machine on which the rendering and tiling module 710 is run. For example, the predetermined memory threshold may be set to 512 megabytes, one gigabyte, and the like. In another example, the rendering and tiling module 710 is run on multiple machines using parallel/distributed processing techniques, and the predetermined memory thresholds may be set to the respective memory available on each of the multiple machines.

It should be recognized that the volume of the tile files may be different. For example, as shown in FIG. 7*a*, tile file 713 for tile C has the largest volume because tile C contains the most complex objects in the scene, even though tiles A-D are equally sized. It should also be recognized that partial tile outputs (e.g., A0, A1, and A2) are appended sequentially to form a tile file for illustration purposes only. The partial tile outputs may be understood as discrete chunks of data that have not been merged or accumulated yet, and these chunks of data are stored in a tile file.

It should also be recognized that, unlike typical tiling techniques, each object added to the scene is processed/rendered to completion and processed only once per scene, because the rendering and tiling module 710 rasterizes the entire scene and not one tile at a time. During rasterization, information may be stored into the deep-framebuffer without dividing the deep-framebuffer into tiles yet. In other words, the deep-framebuffer is a buffer that covers the entire scene; only when the size of the deep-framebuffer reaches the predetermined memory threshold is the deep-framebuffer divided into tiles, and the contents of the tiles saved into tile files. For example, a micropolygon that spans a tile boundary or a micropolygon that is motion-blurred across two tiles has a portion of it saved into one tile file and a portion of it saved into the other.

In contrast, traditional tiling techniques subdivide the deep-framebuffer into tiles during the rasterization process. Rasterization is performed one tile at a time. Because the data from a previously rendered tile is discarded before the next tile is processed, reprocessing of the same geometric primitives for subsequent tiles results in redundant computations. The processes described above avoid these problems, in part, by rasterizing the entire scene, as opposed to one tile at a time, such that each object is processed only once per scene.

With continued reference to FIGS. 7*a* and 7*b*, a scene reconstruction module 750 is a module for reading tile files 711-714 and reconstructing the final scene as if the scene was generated by a machine with unlimited memory and without any tiling or memory flushing. More particularly, the scene reconstruction module 750 first reads in tile files 711-714 and merges each of the tile files into a complete tile file. For example, tile file 711 with partial tile outputs A0, A1, and A2 is merged into a complete tile file 751 within the scene reconstruction module 750. In the "teapots" scene example, the complete tile file 751 is shown as image 510 in FIG. 5. The tile files are merged into a complete tile file by reading the data stored in the tile files and accumulating them in a single deep-framebuffer. Since the accumulated data for an entire tile needs to reside in the deep-framebuffer during merging, the memory allocated for merging should be large enough to process and merge one complete tile. The scene reconstruction module 750 then collects all the complete tile files 751-754 and forms the final scene, which is saved as a deep file 770. This deep file 770 is then passed to the shading and/or re-lighting module 780 for further processing. In the "teapots" scene example, the deep file 770 is shown in FIG. 6.

One of the benefits of tiling the rendered output is that it enables the contents of the deep-framebuffer to be streamed through the various components within the rendering system one manageable tile at a time, or a manageable number of tiles at a time. Generally, the partial tile outputs may not be merged together all at once to form the deep file 770, because of limited memory resources. Therefore, the number of complete tile files that may be merged at any one time depends on the resources available. In one example, only one complete tile file is loaded into memory and merged into the deep file 770 at each time. In another example, a manageable number of complete tile files are loaded into memory and merged into the deep file 770 at each time. Similarly, the shading and/or re-lighting module 780 may process the deep file 770 one tile at a time; the deep file 770 is streamed through the shading and/or re-lighting module 780, one tile at a time.

It should be recognized that each tile is self-contained and independent from the other tiles. Therefore, the tiles may be processed by the scene reconstruction module 750 or the shading and/or re-lighting module 780 in any order. In one exemplary embodiment, the deep file has a single global header at the beginning, followed by an array of tiles. In a parallel/distributed processing environment, multiple machines may be used to process different tiles, and the complete tile files may be appended to the deep file as they become available. In addition, simple arbitration techniques may be employed to prevent the machines from contending with each other when the complete tile files are appended to the deep file. Similarly, in a single-processor environment, the complete tile files may be appended to the deep file as they become available.

Figure 9:
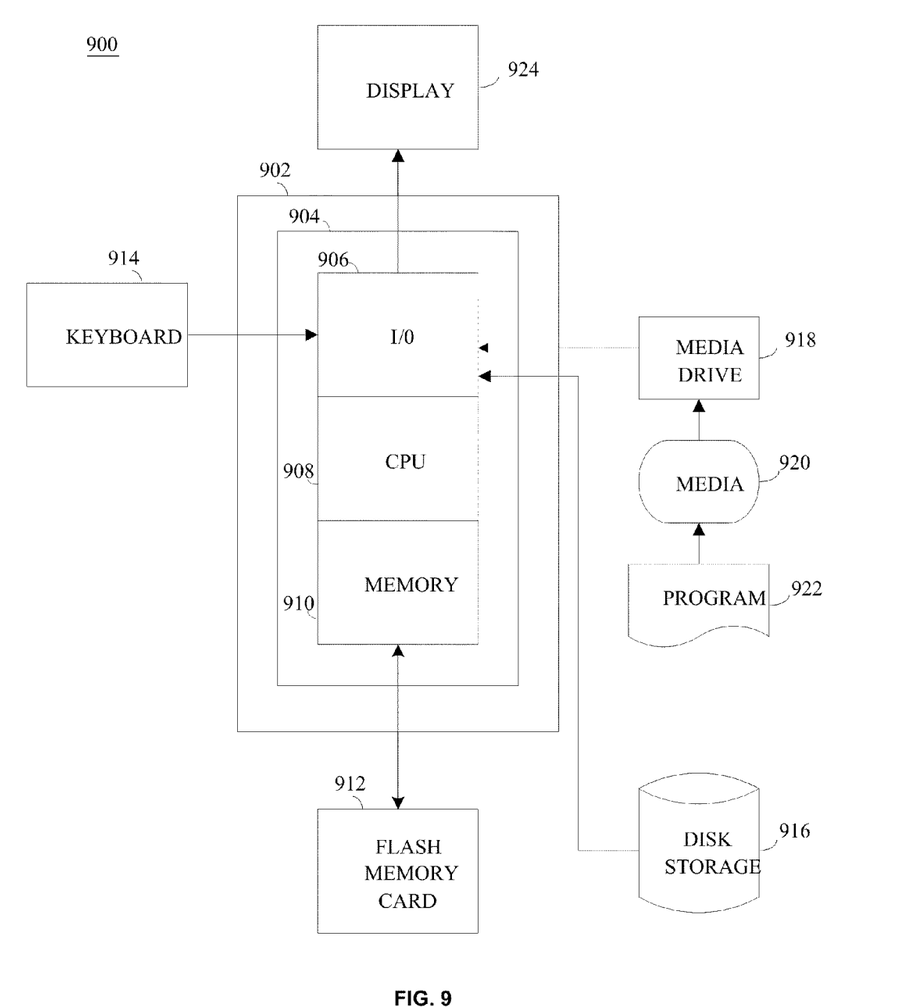
FIG. 9 illustrates an exemplary computing system.

FIG. 9 depicts an exemplary computing system 900 configured to perform any one of the above-described processes. In this context, computing system 900 may include, for example, a processor, memory, storage, and input/output devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform the above-described processes. The main system 902 includes a motherboard 904 having an input/output ("I/O") section 906, one or more central processing units ("CPU") 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of rendering a scene with a plurality of objects, the method comprising:
   rendering an object in a scene to generate a rendered output of the object, wherein a portion of the object spans at least two of a plurality of non-overlapping tiles that subdivide the scene, and wherein the portion of the object is rendered only once in rendering the scene;
   storing the rendered output of the object into a deep-framebuffer; and
   while rendering the object and storing the rendered output of the object, in response to the size of the deep-framebuffer reaching a predetermined threshold, performing the steps of:
      dividing the deep-framebuffer's contents based on the plurality of non-overlapping tiles;
      storing the divided contents of the deep-framebuffer in a plurality of tile files; and
      clearing the contents of the deep-framebuffer.

2. The method of claim 1, wherein the steps of dividing the deep-framebuffer's contents, storing the divided contents, and clearing the contents are performed while the rendering of the object and storing of the rendered output of the object are interrupted.

3. The method of claim 1, wherein the deep-framebuffer is a buffer for the entire scene, and wherein the deep-framebuffer contains sufficient information for shading the scene.

4. The method of claim 1, wherein the portion of the object is a micropolygon.

5. The method of claim 1, wherein the sizes of the plurality of non-overlapping tiles are based on a factor selected from the group consisting of a user input, the locations of the plurality of objects in the scene, and the complexity of the plurality of objects in the scene.

6. The method of claim 1, further comprising reconstructing the rendered scene.

7. The method of claim 6, wherein reconstructing the rendered scene comprises merging the plurality of tile files to form a deep file representing the rendered scene.

8. The method of claim 7, wherein the plurality of tile files are merged in any given order.

9. The method of claim 7, wherein merging the plurality of tile files to form the deep file comprises: loading units of tile files in memory at a time; and processing units of tile files in memory at a time.

10. The method of claim 7, further comprising: streaming the deep file in units of tiles to a shading module; and shading in units of tiles in the shading module.

11. The method of claim 7, further comprising: streaming the deep file in units of tiles to a re-lighting module; and re-lighting in units of tiles in the re-lighting module.

12. A non-transitory computer-readable medium comprising computer-executable instructions for rendering a scene with a plurality of objects, the instructions comprising:
   rendering an object in a scene to generate a rendered output of the object, wherein a portion of the object spans at least two of a plurality of non-overlapping tiles that subdivide the scene, and wherein the portion of the object is rendered only once in rendering the scene;

storing the rendered output of the object into a deep-framebuffer; and while rendering the object and storing the rendered output of the object, in response to the size of the deep-framebuffer reaching a predetermined threshold, performing the steps of:

dividing the deep-framebuffer's contents based on the plurality of non-overlapping tiles;

storing the divided contents of the deep-framebuffer in a plurality of tile files; and clearing the contents of the deep-framebuffer.

13. The non-transitory computer-readable medium of claim 12, wherein the steps of dividing the deep-framebuffer's contents, storing the divided contents, and clearing the contents are performed while the rendering of the object and storing of the rendered output of the object are interrupted.

14. The non-transitory computer-readable medium of claim 12, wherein the deep-framebuffer is a buffer for the entire scene, and wherein the deep-framebuffer contains sufficient information for shading the scene.

15. The non-transitory computer-readable medium of claim 12, wherein the portion of the object is a micropolygon.

16. The non-transitory computer-readable medium of claim 12, wherein the sizes of the plurality of non-overlapping tiles are based on a factor selected from the group consisting of a user input, the locations of the plurality of objects in the scene, and the complexity of the plurality of objects in the scene.

17. The non-transitory computer-readable medium of claim 12, further comprising instructions for reconstructing the rendered scene.

18. The non-transitory computer-readable medium of claim 17, wherein instructions for reconstructing the rendered scene comprise instructions for merging the plurality of tile files to form a deep file representing the rendered scene.

19. The non-transitory computer-readable medium of claim 18, wherein the plurality of tile files are merged in any given orders.

20. The non-transitory computer-readable medium of claim 18, wherein the instructions for merging the plurality of tile files to form the deep file comprise instructions for: loading units of tile files in memory at a time; and processing units of tile files in memory at a time.

21. The non-transitory computer-readable medium of claim 18, further comprising instructions for: streaming the deep file in units of tiles to a shading module; and shading in units of tiles in the shading module.

22. The non-transitory computer-readable medium of claim 18, further comprising instructions for: streaming the deep file in units of tiles to a re-lighting module; and re-lighting in units of tiles in the re-lighting module.

23. Apparatus for rendering a scene with a plurality of objects, the apparatus comprising:

a deep-framebuffer configured to store rendered output of an object; and a rendering and tiling module configured for:

rendering the object in a scene to generate a rendered output of the object, wherein a portion of the object spans at least two of a plurality of non-overlapping tiles that subdivide the scene, and wherein the portion of the object is rendered only once in rendering the scene;

storing the rendered output of the object into the deep-framebuffer; and while rendering the object and storing the rendered output of the object, in response to the size of the deep-framebuffer reaching a predetermined threshold, performing the steps of:

dividing the deep-framebuffer's contents based on the plurality of non-overlapping tiles;

storing the divided contents of the deep-framebuffer in a plurality of tile files; and clearing the contents of the deep-framebuffer.

24. The apparatus of claim 23, wherein the steps of dividing the deep-framebuffer's contents, storing the divided contents, and clearing the contents are performed while the rendering of the object and storing of the rendered output of the object are interrupted.

25. The apparatus of claim 23, wherein the deep-framebuffer is a buffer for the entire scene, and wherein the deep-framebuffer contains sufficient information for shading the scene.

26. The apparatus of claim 23, wherein the portion of the object is a micropolygon.

27. The apparatus of claim 23, wherein the sizes of the plurality of non-overlapping tiles are based on a factor selected from the group consisting of a user input, the locations of the plurality of objects in the scene, and the complexity of the plurality of objects in the scene.

28. The apparatus of claim 23, further comprising a scene reconstruction module configured for reconstructing the rendered scene.

29. The apparatus of claim 28, wherein the scene reconstruction module is further configured for merging the plurality of tile files to form a deep file representing the rendered scene.

30. The apparatus of claim 29, wherein the plurality of tile files are merged in any given orders.

31. The apparatus of claim 29, wherein merging the plurality of tile files to form the deep file comprises loading units of tile files in memory at a time; and processing units of tile files in memory at a time.

32. The apparatus of claim 29, further comprising: a shading module connected to the scene reconstruction module, wherein the scene reconstruction module streams the deep file in units of tiles to the shading module, and wherein the shading module performs shading in units of tiles.

33. The apparatus of claim 29, further comprising: a re-lighting module connected to the scene reconstruction module, wherein the scene reconstruction module streams the deep file in units of tiles to the re-lighting module, and wherein the re-lighting module performs re-lighting in units of tiles.

* * * * *